United States Patent [19]

Beckert et al.

[11] Patent Number: 5,643,610

[45] Date of Patent: Jul. 1, 1997

[54] WINDSHIELD REPAIR INJECTOR

[75] Inventors: Adolf F. Beckert, Woodbury; Jonathan P. Thomas, Maple Lake, both of Minn.

[73] Assignee: TCG International Inc., Minneapolis, Minn.

[21] Appl. No.: 685,707

[22] Filed: Jul. 24, 1996

Related U.S. Application Data

[62] Division of Ser. No. 405,141, Mar. 16, 1995, Pat. No. 5,565,217.

[51] Int. Cl.$^6$ ............................................. B32B 35/00
[52] U.S. Cl. ........................................... 425/12; 425/13
[58] Field of Search ............................. 425/12, 13, 11; 156/94; 264/36

[56] References Cited

U.S. PATENT DOCUMENTS

| | | | |
|---|---|---|---|
| 3,070,391 | 12/1962 | Hofmann | 403/349 |
| 3,562,366 | 2/1971 | Sold | 264/36 |
| 3,765,975 | 10/1973 | Hollingsworth | 156/94 |
| 3,988,400 | 10/1976 | Luhmann, III | 264/36 |
| 3,993,520 | 11/1976 | Werner et al. | 425/13 |
| 4,032,272 | 6/1977 | Miller | 425/13 |
| 4,047,863 | 9/1977 | McCluskey et al. | 425/13 |
| 4,132,516 | 1/1979 | Story | 425/13 |
| 4,200,478 | 4/1980 | Jacino et al. | 425/12 |
| 4,231,494 | 11/1980 | Greenwood | 403/348 |
| 4,249,869 | 2/1981 | Petersen | 425/13 |
| 4,280,861 | 7/1981 | Schwartz | 264/36 |
| 4,291,866 | 9/1981 | Petersen | 269/95 |
| 4,385,015 | 5/1983 | Klettke | 425/12 |
| 4,385,879 | 5/1983 | Wilkinson | 425/12 |
| 4,419,305 | 12/1983 | Matles | 264/36 |
| 4,569,808 | 2/1986 | Smali | 425/12 |
| 4,597,727 | 7/1986 | Birkhauser, III | 425/12 |
| 4,622,085 | 11/1986 | Yamada et al. | 156/94 |
| 4,681,520 | 7/1987 | Birkhauser, III | 425/12 |
| 4,744,841 | 5/1988 | Thomas | 425/13 |
| 4,775,305 | 10/1988 | Alexander et al. | 425/12 |
| 4,814,185 | 3/1989 | Jones | 425/12 |
| 4,820,148 | 4/1989 | Anderson | 425/13 |
| 4,921,411 | 5/1990 | Ottenheimer | 425/12 |
| 4,954,300 | 9/1990 | Dotson | 425/12 |
| 4,995,798 | 2/1991 | Ameter | 425/13 |
| 5,069,836 | 12/1991 | Werner et al. | 264/36 |
| 5,104,304 | 4/1992 | Dotson | 425/12 |
| 5,234,325 | 8/1993 | Hill | 425/12 |
| 5,425,827 | 6/1995 | Campfield | 425/12 |
| 5,429,692 | 7/1995 | Campfield | 425/13 |
| B1 5,116,441 | 11/1993 | Campfield, Jr. | 425/13 |

*Primary Examiner*—Robert Davis
*Attorney, Agent, or Firm*—Merchant, Gould Smith, Edell, Welter & Schmidt P.A.

[57] ABSTRACT

A windshield repair apparatus and method are provided wherein a quick connect/disconnect bayonet mounting arrangement mounts an injector to a support apparatus which holds the injector relative to a windshield for repair. A ramp surface may be provided with respect to the bayonet mounting arrangement for selective adjustment of the position of the injector relative to the support apparatus. A rubber stopper with two passages is provided with the injector, one passage central to the stopper for receipt of a mechanical probe, and one passage offset from the central passage for receipt of pressures greater than or less than atmospheric pressure during use.

8 Claims, 7 Drawing Sheets

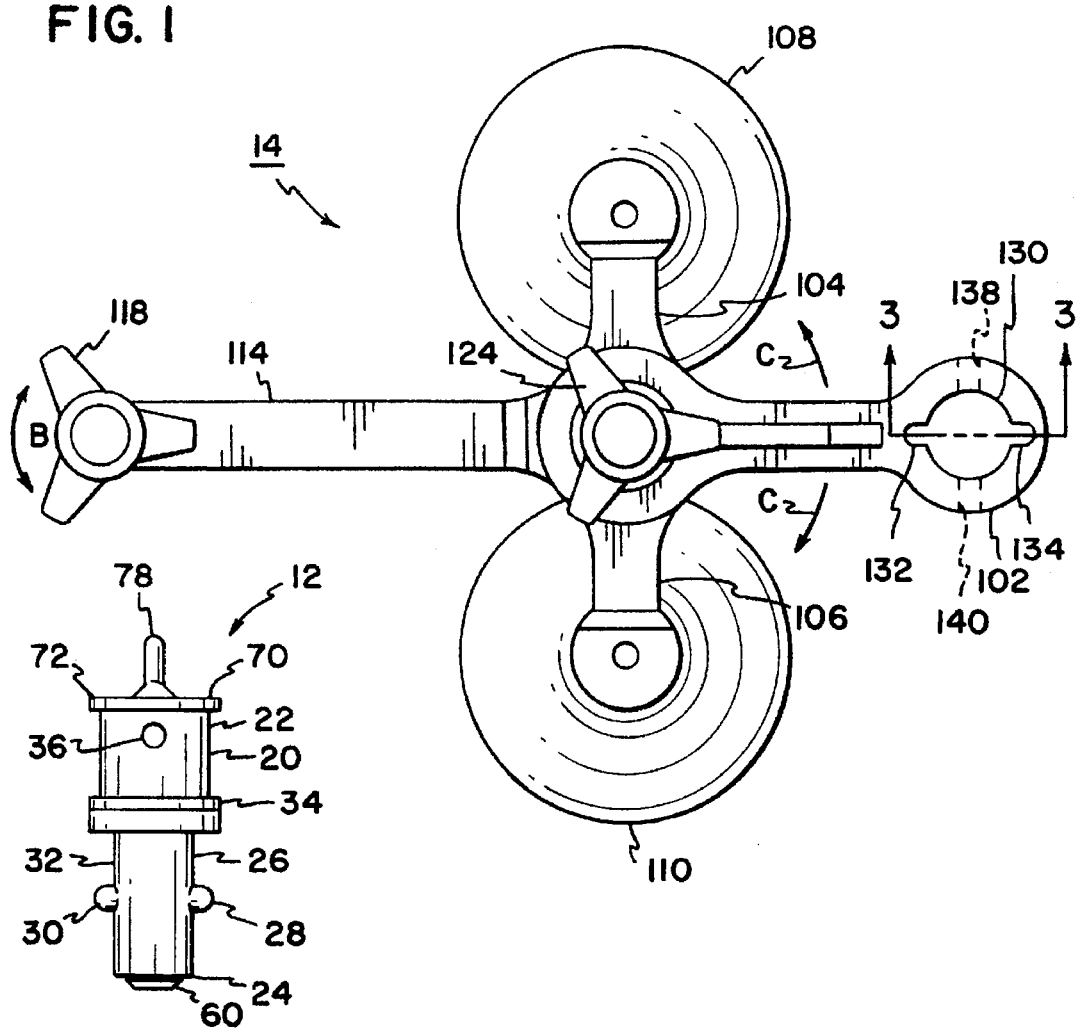
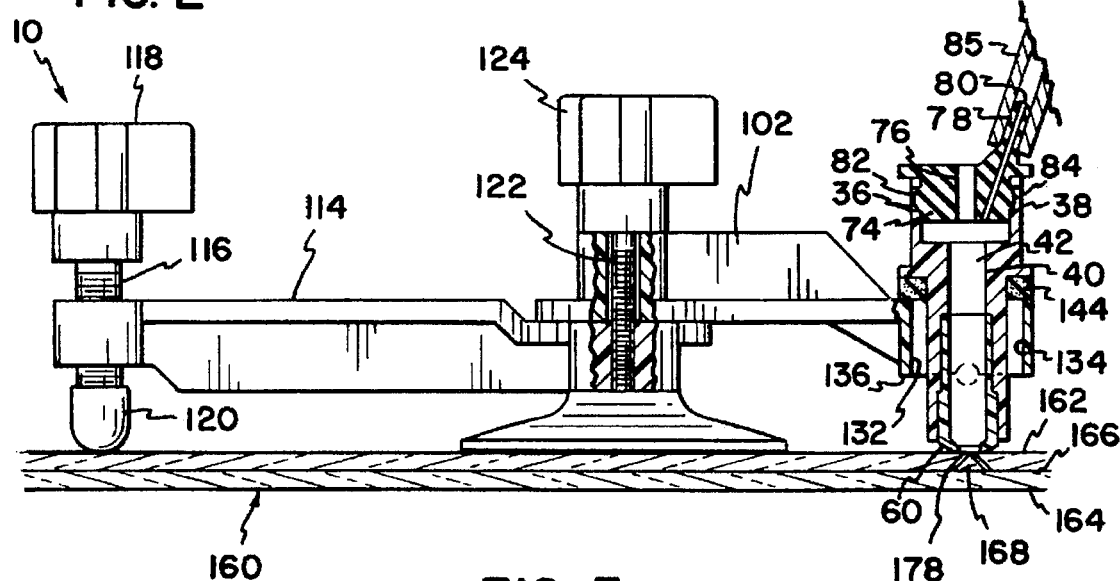

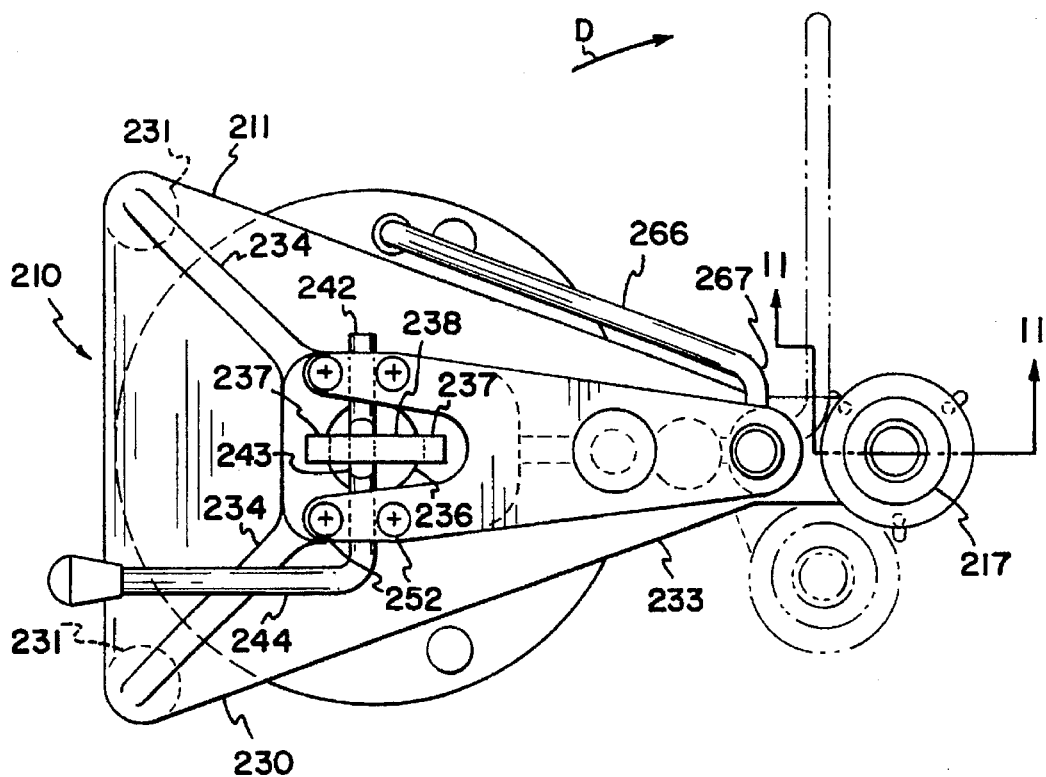
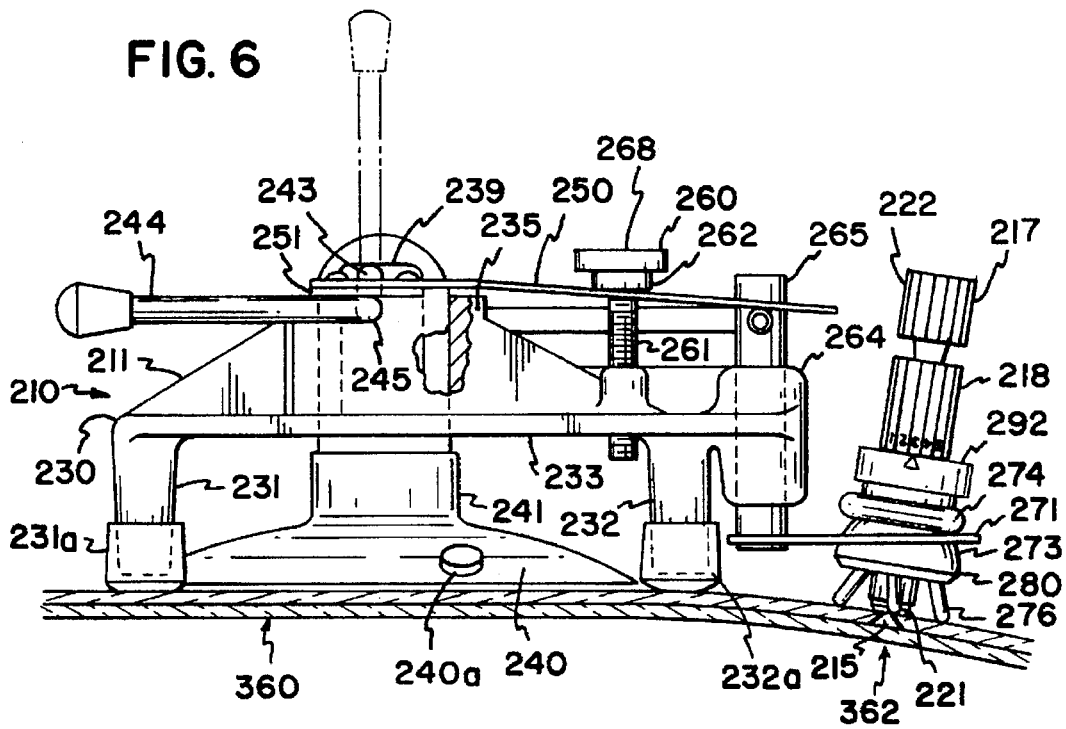

WINDSHIELD REPAIR INJECTOR

This is a division of application Ser. No. 08/405,141, now U.S. Pat. No. 5,565,217, filed Mar. 16, 1995, which application is incorporated herein by reference.

FIELD OF THE INVENTION

The present invention relates to apparatus and methods for repairing breaks in windshields.

BACKGROUND OF THE INVENTION

From time to time, a vehicle windshield will break, such as due to an object impacting against the windshield. A bull's-eye break may occur wherein the outer layer of safety glass incurs a break in the shape of an inverted cone. Other break shapes and cracks may be incurred in addition to or instead of the bull's-eye break. The inside layer of safety glass is typically unbroken. U.S. Pat. No. 4,291,866, issued Sep. 29, 1981, the disclosure of which is hereby incorporated by reference, illustrates an apparatus usable to repair a break in a vehicle windshield. The apparatus disclosed in the '866 reference includes a support apparatus for supporting an injector held against the windshield so that repair material can be applied to the break site. A repaired windshield is desirable over replacement of the windshield which can be quite costly, and time consuming.

Various concerns arise in connection with repair of windshields. One area of concern relates to the ease of use of the windshield repair apparatus. In particular, the ease in which the site is prepared, and the ease of application of the repair material are concerns. Accessibility to the site for the application of the repair material, and removal of impurities (e.g. air, moisture, dirt) from the break site and from the repair material are concerns. In addition, the application of pressure above atmospheric pressure and the application of pressure below atmospheric pressure at the break site are desirable. Mechanical engagement of portions of the break site is also desirable. A goal of the repair process is to leave an optically invisible or virtually invisible repair site. Minimizing repair material waste is also a concern.

There is a need in the prior art for apparatus and methods which address the above concerns and other concerns.

SUMMARY OF THE INVENTION

The present invention relates to a windshield repair apparatus including an injector for applying repair material, and a support apparatus for holding the injector adjacent to the break area. A bayonet mounting arrangement mounts the injector to the support apparatus.

The injector has an outside surface with a bayonet extending from the outside surface, and an inner surface defining an inner passage through the injector from a tip of the injector engageable with the windshield to an open end disposed away from the windshield. The injector mounts to the support apparatus wherein the injector is positioned in a passage through the support apparatus. The passage includes a slot for receipt of the bayonet during mounting and dismounting of the injector to the support apparatus. The support apparatus further includes a shoulder for engaging the bayonet once the bayonet is rotated away from the slot. A resilient member biases the injector such that the bayonet remains engaged with the shoulder in the rotated position.

Preferably, the shoulder of the support apparatus includes at least one notch for secure receipt of the bayonet in a locked position. In one embodiment, the support apparatus includes a fitting with a spherical outside surface and with the shoulder defining a ramp surface and a plurality of notches.

The injector preferably includes a flange which traps a resilient ring between the support apparatus and the injector to maintain the bayonet in engagement with the shoulder.

Preferably, a resilient stopper closes off the open end of the injector and defines a central passage, and a pressure passage offset from the central passage. The central passage is configured for receipt of a mechanical probe used to engage the break area. The pressure passage defines a nipple connectable to a pressure source.

The present invention also relates to an injector usable with a support apparatus wherein the injector includes an inner surface defining an inner passage extending from a tip to an opposite end, a resilient fitting at the tip disposed partially within the inner passage, and a resilient stopper with two passages closing off the opposite end. One passage of the stopper is central to the stopper and is sized for receipt of a mechanical probe. A second passage is offset from the central passage and defines a pressure passage for the application of pressure greater than atmospheric pressure and/or a vacuum. The second passage generally defines a nipple extension from the stopper.

The present invention also relates to an injector usable with a support apparatus wherein the injector includes a body having an inner surface defining an inner passage extending from a tip to an opposite end, and an outside surface including a bayonet and a flange disposed away from the bayonet in a direction toward the opposite end of the injector. A resilient fitting is positioned at the tip, disposed partially within the inner passage.

The present invention also relates to a stopper useable in an injector where the stopper includes a resilient body with a central longitudinal axis, an outer surface and two inner passages. The outer surface includes at least one projection transverse to the axis. One of the inner passages is central to the stopper and concentric with the axis. The other inner passage is offset from the axis and includes a nipple extension from the body. The outer surface also defines an annular flange.

The present invention also relates to a method of repairing a windshield including the steps of providing an injector and a support apparatus with a bayonet mounting arrangement for mounting the injector to the support apparatus, inserting the injector into a passage through the support apparatus with the bayonet positioned in a slot of the passage, and rotating the injector relative to the support apparatus to lock the injector to the support apparatus. The method may further preferably include the step of providing a ramp surface with notches in connection with the bayonet mounting arrangement, and adjusting the injector relative to the support apparatus by selecting a notch location on the ramp surface for the bayonet. The injector is engaged with the windshield to allow for the application of a pressure environment different than atmospheric pressure, application of the repair material, and mechanical engagement of the break site.

BRIEF DESCRIPTION OF THE DRAWINGS

FIG. 1 is a plan view of a first embodiment of a support apparatus in accordance with the invention.

FIG. 2 is a side view of a first embodiment of an injector usable with the support apparatus of FIG. 1.

FIG. 3 is a side view of a first embodiment of a windshield repair apparatus including the injector of FIG. 2 mounted to the support apparatus of FIG. 1, with portions of the injector and the support apparatus shown in cross-section, taken along lines 3—3 in FIG. 1.

FIG. 5 is a plan view of a second embodiment of a windshield repair apparatus including a support apparatus and an injector mounted to the support apparatus.

FIG. 6 is a side view of the windshield repair apparatus shown in FIG. 5.

DETAILED DESCRIPTION OF THE PREFERRED EMBODIMENTS

Figure 11:
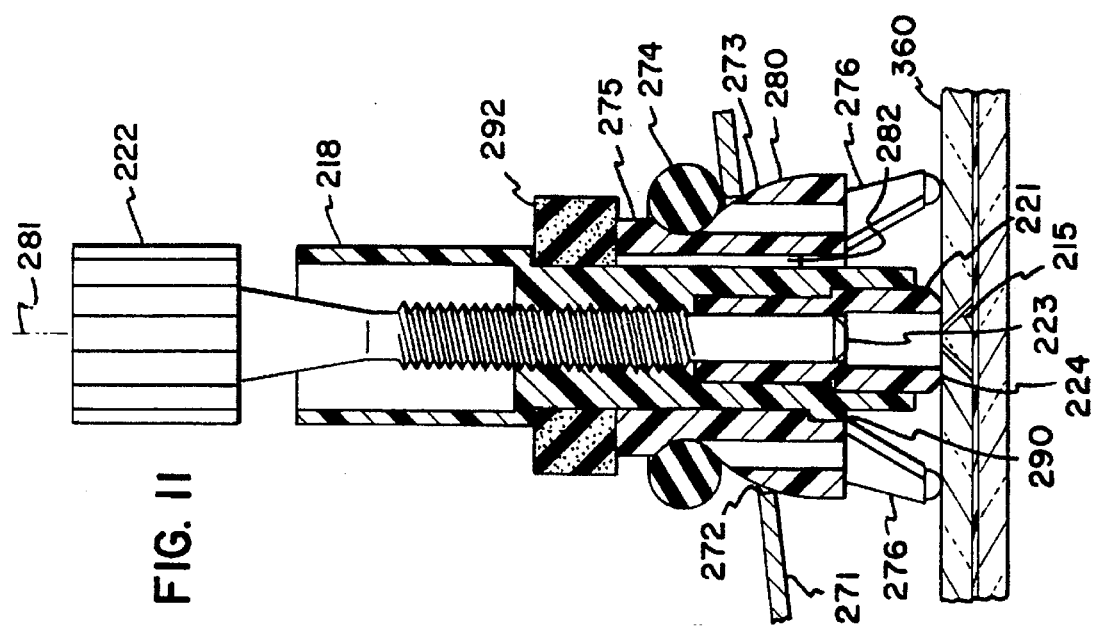
FIG. 11 is an enlarged cross-sectional side view of a portion of the support apparatus and the injector of FIG. 5, taken along lines 11—11.

Referring now to FIGS. 1–4, a first embodiment of a windshield repair apparatus 10 is shown. Apparatus 10 includes an injector 12 which mounts to a support apparatus 14. A support apparatus 14 holds injector 12 in position adjacent a break area 178 in a windshield 160. Once injector 12 is properly positioned, application of air pressure above or below atmospheric pressure to the break area is possible. Also, injector 12 is used to apply a repair material, such as ultra-violet light curable plastic resin, to break area 178. In addition, injector 12 facilitates use of a tool to mechanically engage the break area to facilitate repair during the application of pressure (+ or –) and/or the repair material.

Figure 4:
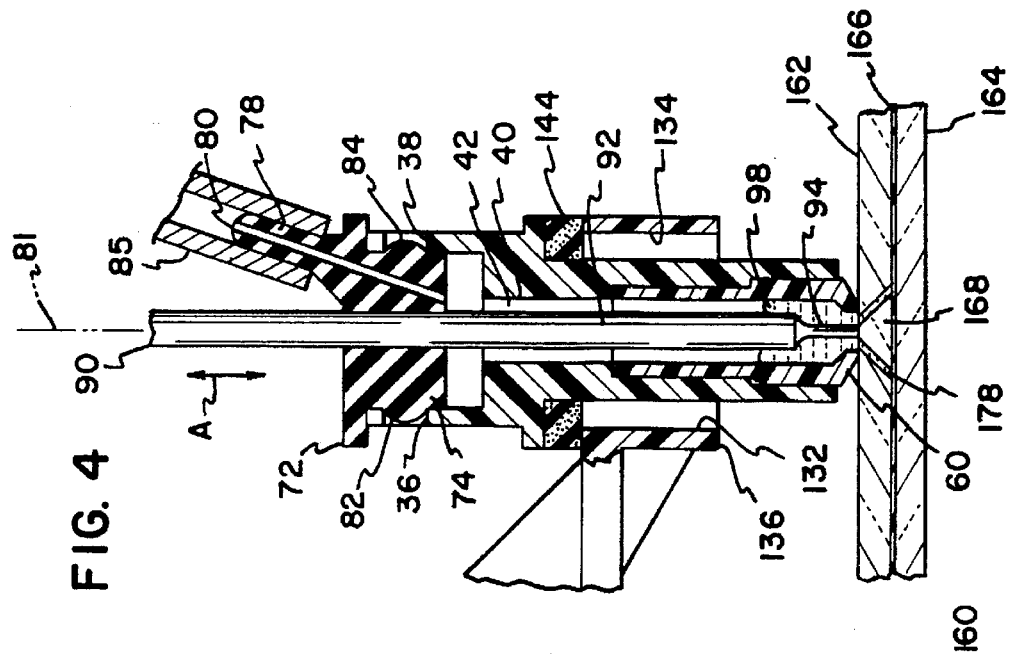
FIG. 4 is an enlarged view of a portion of the support apparatus and the injector of FIG. 3, showing a mechanical probe and repair material during use.
Figure 8:
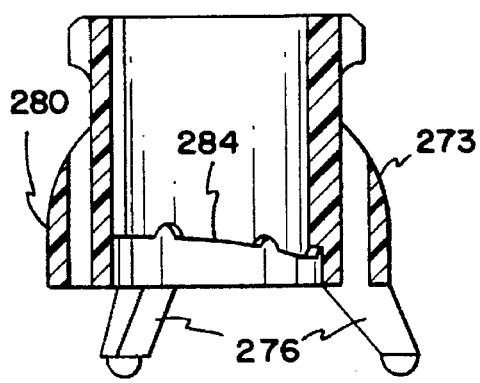
FIG. 8 is a side view in cross section of the fitting shown in FIG. 7, taken along lines 8—8.
Figure 7:
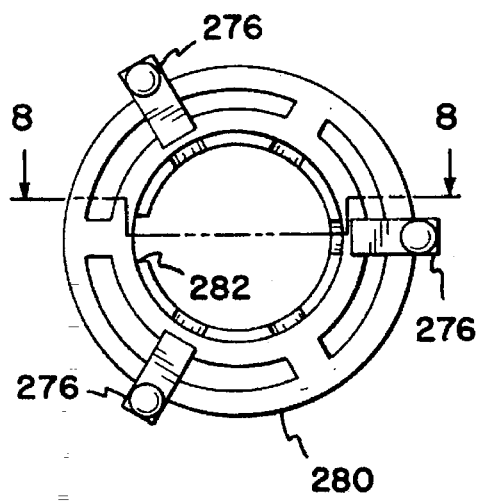
FIG. 7 is an enlarged bottom view of the fitting of the support apparatus of FIGS. 5 and 6.

Referring now to FIGS. 2–4, injector 12 includes a body 20 with a tip 24 and an opposite end 22. An outer surface 26 extends from tip 24 to opposite end 22. Two bayonets 28, 30 project from outer surface 26. Spaced from bayonets 28, 30 in the direction of opposite end 22 is an annular flange 34. Spaced between annular flange 34 and bayonets 28, 30 is a recess 32. Inner surface 40 of body 20 defines an inner passage 42 extending from tip 24 to opposite end 22. Mounting holes 36, 38 extend from outer surface 26 to inner surface 40 of body 20 to facilitate mounting of a resilient stopper 70 adjacent opposite end 22 to close the open end of body 20. Adjacent tip 24 is positioned a resilient inner sleeve or fitting 60 which protrudes from body 20 to sealably engage windshield 160. Resilient inner sleeve 60 facilitates a sealable engagement around break area 178 for the application of pressure (+ or –) and the containment of the break repair material.

Stopper 70 closes off inner passage 42 at opposite end 22 of body 20. Stopper 70 includes an annular flange 72 engageable with end 22 of body 20. Central body portion 74 of stopper 70 resides in inner passage 42 of body 20. Bumps or projections 82, 84 of central body portion 74 are located in holes 36, 38, respectively, of body 20. A central passage 76 is coaxial with axis 81 of inner passage 42. Offset from axis 81 is a second passage 78 including a nipple 80 extending from central body portion 74 which defines a pressure port. Preferably, nipple 80 is attachable via a conduit 85 to a source of positive pressure, and a source of negative pressure or vacuum, relative to atmospheric pressure. The application of pressure above atmospheric pressure, and the application of a vacuum facilitates proper placement of the repair material in the break area 178, and removal of impurities which detract from the appearance of break area 178 following the addition of the repair material. Stopper 70 can be made from a variety of resilient materials, including rubber.

As is shown in FIG. 4, a mechanical probe 90 is received in central passage 76 of stopper 70. An air tight seal is formed between stopper 70 and shaft 92 of probe 90. A tip 94 of probe 90 is configured to engage break area 178. In particular, tip 94 engages glass cone 168 of break area 178 to allow for increased application of the repair material and removal of impurities. Cone 168 is a portion of outer safety glass layer 162. Cone 168 is formed by the impact of an object hitting against windshield 160. Second inner layer of safety glass 164 typically remains unbroken. A plastic middle layer 166 is positioned between outer safety glass layer 162 and inner safety layer 164. As shown in FIG. 4, resin 98 as the repair material is located within inner passage 42 adjacent break area 178. By the application of positive and negative pressures via air passage 78, and mechanical engagement with probe 90, resin 98 is moved into the air spaces of break area 178 to repair windshield 160. Movement of probe 90 is in the direction of arrow A to engage/disengage break area 178. Subsequent curing of resin 98 leaves behind an optically invisible or nearly invisible repair area by filling the cracks between the cracked and/or missing portions of the windshield 160.

Referring again to FIGS. 1 and 3, support apparatus 14 includes a first arm 102 for holding injector 12. Second arm 104 with suction cup 108, and third arm 106 with suction cup 110 facilitate mounting of support apparatus 14 to windshield 160. Suction cups 108, 110 are made from a resilient material, such as rubber, which securely mounts to a non-porous surface like windshield 160. A fourth arm 114 provides adjustability of the positioning of injector 12 relative to windshield 160. A threaded shaft 116 threadably passes through fourth arm 114. An adjusting knob 118 is utilized to rotate threaded shaft 116 to adjust the spacing of tip 120 from fourth arm 114. During use, rotation of threaded shaft 116 causes a pivoting movement of support apparatus 14 about a pivot point located adjacent to second and third arms 104, 106, and suction cups 108, 110 wherein injector 12 can be moved toward and away from windshield 160. Once resilient fitting 60 engages outside safety glass layer 162, adjustment of threaded shaft 116 can be made to increase or decrease the pressure applied by resilient fitting 60. Adjustability of threaded shaft 116 is via rotation of knob 118 in the direction of arrow B as shown in FIG. 1.

Further adjustability of support apparatus 14 is seen with rotation of first arm 102 relative to a remainder of support apparatus 14 in the direction of arrows C shown in FIG. 1. Such adjustability is provided via a threaded shaft 122 interconnected to knob 124. Knob 124 rotates threaded shaft 122 relative to second and third arms 104, 106 to tighten or loosen the engagement of first arm 102 to permit rotation of arm 102 in the manner shown by arrow C of FIG. 1 and then subsequent re-tightening.

First arm 102 includes passage 130 for receipt of injector 12. Slots 132, 134 on opposite sides of passage 130 accommodate bayonets 28, 30 of injector 12 during relative axial movement along axis 81. Once bayonets 28, 30 are past shoulder 136, injector 12 is rotated relative to first arm 102 such that bayonets 28, 30 trap first arm 102 in recess 32 between bayonets 28, 30 and flange 34. A resilient spring member 144, such as a foam ring, biases injector 12 in an axial direction away from first arm 102 such that bayonets 28, 30 engage shoulder 136 of first arm 102. Notches 138, 140 receive bayonets 28, 30 to lock injector 12 relative to support apparatus 14. In this manner, a quick connect/ disconnect feature is provided. Convenient attachment and/ or replacement of injector 12 with support apparatus 14 is facilitated. First, second, third and fourth arms 102, 104, 106, 114 can be made from a variety of materials, including molded plastic. Spring member 144 is conveniently held to injector 12 during handling separate from support apparatus 14 by being trapped between flange 34 and bayonets 28, 30.

Referring now to FIGS. 5–11, a second embodiment of a windshield repair apparatus 210 is shown mounted to a windshield 360. Windshield 360 is shown with a curved portion 362. Apparatus 210 is particularly advantageous for use with curved windshields. However, apparatus 210 is also usable with more planar windshields of the type shown in FIG. 3. In addition, placement of apparatus 210 on a windshield with a curved portion may be possible such that apparatus 210 does not traverse a curve, but is maintained generally in a plane.

Windshield repair apparatus 210 supports injector 217 adjacent windshield 360. Injector 217 includes an outer housing 218 that is mounted to a self-aligning support member or fitting 280 with a quick connect/disconnect bayonet mounting arrangement. Outer housing 218 has an inner resilient fitting 221, the outer end 224 of which seals against the surface of windshield 360 after the end has been forced against the surface. An interior screw assembly 222 includes an injector end 223 that slidably mounts inside fitting 221, and the upper end of screw assembly 222 is threadably mounted on interior threads in outer housing 218. By threading screw assembly 222 downwardly, resin inside fitting 221 can be forced into the break area that is aligned with the open end of fitting 221, to inject this resin into the crack to form the repair.

With reference to FIGS. 5 and 6, windshield repair apparatus 210 includes a support apparatus 211 including a unitary frame 230 which is generally triangularly shaped as shown in FIG. 5, and includes two legs 231 which extend perpendicularly to the plane of the triangle at opposite corners of the base of the triangle, and a leg 232 which is positioned on the end of frame 230 adjacent to support fitting 280. Frame 230 includes a generally planar support plate portion 233, and two reinforcing ribs 234 extending out to the corners to support legs 231. A center hub or column 235 is integral with support plate portion 233 and has a central opening 236. On diametrically opposed sides of central opening 236 there are vertical internal guideways 237. Guideways 237 are 180° apart, and are used to slidably receive and mount a flat tang 238 of a suction cup assembly. The suction cup assembly includes a large suction cup 240, which has a neck 241 in which tang 238 is mounted. Suction cup 240 is generally made of a resilient material such as rubber which will seal against a non-porous surface.

Tang 238 has a central opening 239 that is used as a cam or crank follower and an eccentric or crank assembly 242 passes through opening 239. Crank assembly 242 has a throw or eccentric portion 243 at the center portion aligned with the edges of opening 239, and an actuator handle 244 is provided at one end of crank assembly 242. Crank assembly 242 is rotatably mounted on center column 235 in recesses 245 as shown in FIG. 6.

Crank assembly 242 is retained in recesses 245 through a clamped on, spring blade 250 that is spaced above the upper surface of center column 235 with spacer members 251. Blade 250 is securely mounted to frame 230 at the upper side of center column 235 through the use of suitable fasteners 252.

Throw 243 of crank assembly 242 is to load frame 230 securely down against windshield 360 after suction cup 240 has been placed on the windshield. Initially, actuator handle 244 of crank assembly 242 will be in its upright position as shown in dotted lines in FIG. 6 and this will make throw 243 of crank assembly 242 generally horizontal, thereby increasing the allowable space between the sealing edges of suction cup 240 and the lower side of frame 230. When actuator handle 244 is moved to a position as shown in FIG. 6 in solid lines, throw 243 will provide a relative force between tang 238 and frame 230 to tend to move tang 238 upwardly relative to frame 230 as shown in FIG. 6 or conversely, to move frame 230 downwardly toward the windshield when suction cup 240 has been manually placed on the windshield. Legs 231 and 232 are thus forced against the windshield. Suction cup 240 which seals on the windshield, stretches under the load of throw 243 to resiliently load frame 230 against the windshield.

Legs 231 and 232 have small rubber tips 231a and 232a, respectively, which bear against the windshield and tend to keep frame 230 from slipping once it is engaged with the windshield.

Blade 250 extends in direction toward support fitting 280, and is made of a slightly springy material. As shown, a control screw 260 is threadably mounted into a boss 261 which is formed integrally with frame 230. Screw 260 passes through an aperture in blade 250, and screw 260 has a bearing collar 262 that bears against the upper surface of the blade. Upon threading of screw 260 relative to boss 261, blade 250 will be forced so that its outer end will be forced toward planar support plate portion 233.

The end of frame 230 forming the apex of its triangle shape opposite from legs 231, has a hub 264 integral therewith. Hub 264 is bored out and slidably mounts a pin 265. Pin 265 can move up and down relative to this bore, and is rotatably mounted in the bore of hub 264 so that it can move about its axis. Pin 265 has a cross control lever 266 which is mounted through an aperture or cross bore. Cross control lever 266 has a leg 267 which passes through the aperture in pin 265, and leg 267 is held in place underneath blade 250. Thus, blade 250 bears down on leg 267 of the control lever and cross control lever 266 can be moved as indicated by arrow D to a dotted line position as shown in FIG. 5. This in turn will cause pin 265 to rotate about its upright axis.

At the lower end of pin 265, below hub 264, there is support arm 271 fixedly attached to pin 265 with a suitable clamp or fastening means. Arm 271 is secured to pin 265 and moves with the pin when the pin is rotated.

Arm 271 in turn has an aperture indicated at 272 (see FIG. 11) at its outer end. Support fitting 280 is mounted in this aperture. It can be seen that support fitting 280 has a part spherical outer surface indicated at 273 which bears against the lower edges of aperture 272. The part spherical surface 273 permits support fitting 280 to tilt universally relative to arm 271 while under compression. The upper portion of support fitting 280 extends through the opening and has a small annular flange collar 275 formed on it. A resilient doughnut or ring of rubber 274 is placed around the upper portion of support fitting 280 on the upper side of arm 271 and under collar 275. Resilient ring 274 holds support fitting 280 on arm 271 with part spherical surface 273 adjacent to the underside of arm 271 to prevent support fitting 280 from falling downwardly through aperture 272.

Support fitting 280 has three legs 276 on its lower side, which form a tripod. These legs 276 may be made of suitable plastic or other material which does not mark the windshield being repaired. If desired, legs 276 can be made in separate pieces from support fitting 280, which can be made of molded plastic or similar material.

As tripod legs 276 engage a windshield to be repaired, they will move or swivel support fitting 280 in aperture 272 until legs 276 all contact the windshield in the normal self leveling section of a tripod. The axis of the bore through the support fitting 280 is then normal to the plane defined by the outer tips of legs 276, which plane is generally parallel to the tangent plane at the center of the opening to bull's-eye break 215. Therefore, even on a curved windshield, legs 276 serve to orient the axis of support fitting 280 and injector assembly 217 normal to the tangent plane at the apex of the break when the axis of the injector is centered over the break. This serves to properly orient resilient fitting 221 so that end 224 engaging the windshield seals well around the opening to break 215. Tripod legs 276 also provide stability for support of the injector directly adjacent the injector. Legs 276 are mechanically coupled to support fitting 280 and fitting 280 directly supports injector 217 through the bayonet mounting arrangement.

It can be seen that pin 265 can move up and down in hub 264 a limited amount. Leg 267 of control arm 266 bears against the upper edges of hub 264 to prevent pin 265 from falling downwardly through hub 264. Of course the only time that it would fall downwardly is when frame 230 was removed from windshield 360.

In operation, then, actuator handle 244 which regulates throw 243 for the suction cup assembly is moved to its dotted line position. The suction cup assembly thus protrudes downwardly below the support plane of tips 231a and 232a. An initial alignment is made relative to break 215 by visually aligning the center of the injector assembly 217 (which is supported in fitting 280) over the break. Suction cup 240 is then pushed down so that its edges seal on the windshield. Suction cup 240 can be made to adhere to the windshield surface. It is made fairly secure, but if desired left loose enough to permit sliding the cup for more accurate visual alignment of the injector. Tips 231a and 232a of legs 231 and 232 rest against the windshield. When injector 217 is located, actuator handle 244 is moved in a counterclockwise direction as shown in FIG. 6 to pull tang 238 upwardly relative to frame 230 and this tends to stretch the top of suction cup 240 upwardly and a resilient force pushes tips 231a and 232a firmly against the surface of the windshield.

It can be seen that even with a curve in the windshield, support fitting 280, through its legs 276, will engage the surface of the windshield and the force with which legs 276 engage the windshield is controlled by threading control screw 260 to bend blade 250 and apply a spring load to pin 265 through leg 267 of lever 266. Final alignment of injector 217 can be made by swinging lever 266 about the axis of pin 265 prior to tightening down screw 260. Screw 260 as shown can have a convenient hand wheel 268 at the top.

Further, it should be noted that the part spherical outer surface 273 of fitting 280 will permit legs 276 to seek their support plane inasmuch as they are tripod legs. The legs then firmly hold injector 217 in the proper position for injecting resin into the crack to be repaired.

The present support apparatus 211 has the advantage of being stable, and being self-leveling in that tripod legs 231, 232 of frame 230 provide the proper stable support, and legs 276 for supporting injector 217 independently level themselves along the small diameter described by the ends of the legs 276. Leveling of legs 276 eliminates the need for utilizing leveling screws, which can be time consuming in certain instances. The alignment is made easier too, by permitting support fitting 280 and arm 271 to be rotated about the axis of pin 265 for correct alignment with the break.

The amount of force toward the windshield on fitting 221 also can be controlled so that good sealing is achieved even with a curved windshield because of the leveling of the legs 276. The support plane of legs 276 can be on a different level than and at an angle to the plane defined by the bottom surfaces of tips 231a and 232a.

In removing suction cup 240, small lugs 240a can be provided for lifting the edges of suction cup 240 to break the seal and thus let the unit be easily raised after activator handle 244 has been released.

Referring now to FIGS. 7–10, fitting 280 and outer housing 218 are shown in greater detail. Fitting 280 includes a slot 282 for receipt of a bayonet 290 extending from outer housing 218. Slot 282 allows for slidable receipt of injector 217 in fitting 280 during mounting and dismounting in the axial direction. Once slidably received, injector 217 is rotated relative to fitting 280 about the axis to lock injector 217 to fitting 280. Fitting 280 includes a shoulder defining a ramp surface 284 at an angle to axis 281 of injector 217 which engages bayonet 290 in the locked state. A plurality of notches 286a–e are provided to locate bayonet 290 in the locked state. Ramp surface 284, in combination with notches 286a–e, provide five discrete mounting locations of injector 217 relative to fitting 280 such that injector 217 is provided with a plurality of relative axial positions to fitting 280. More or less discrete mounting locations are possible, as desired. Spring member 292 in the form of a resilient foam ring biases bayonet 290 into one of notches 286a–e to hold its location during use. Stop 288 limits the amount of rotation of bayonet 290.

Indicia 225 may be provided on outer housing 218 and fitting 280 for an external indication where bayonet 290 is located relative to ramp surface 284.

Figure 12:
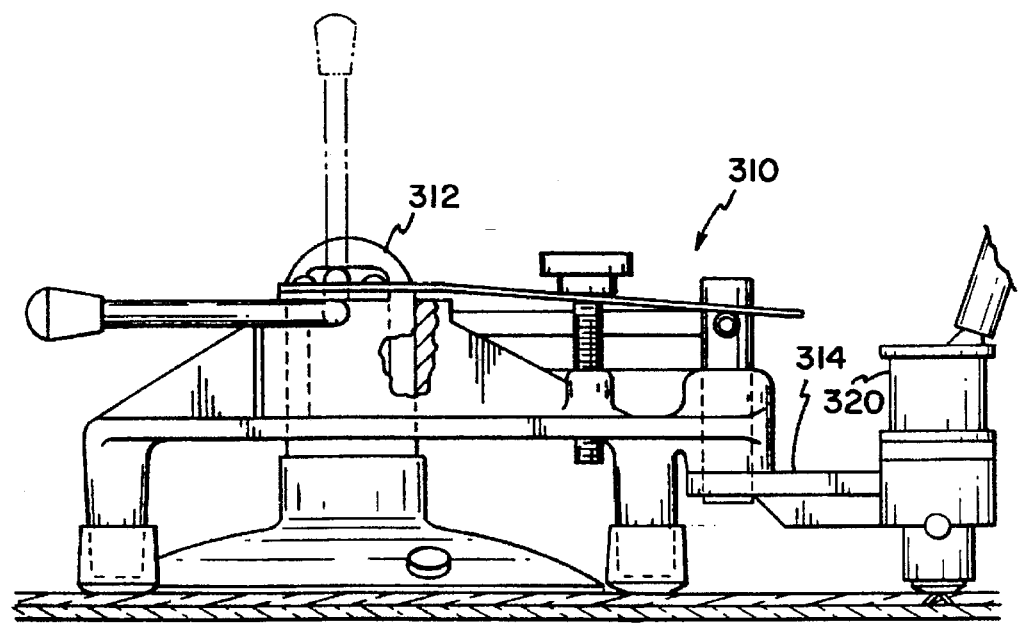
FIG. 12 is a side view of a third embodiment of a windshield repair apparatus including a modified support apparatus in combination with the injector of FIGS. 2-4.
Figure 10:
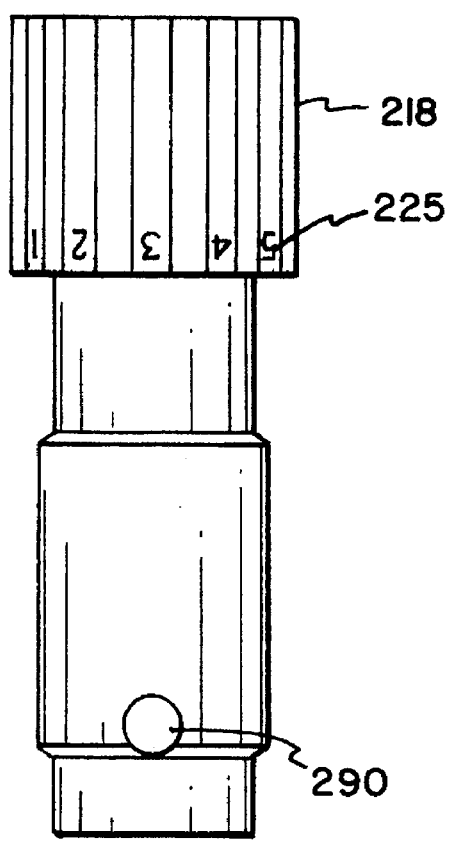
FIG. 10 is an enlarged side view of the outer housing of the injector shown in FIGS. 5 and 6.
Figure 9:
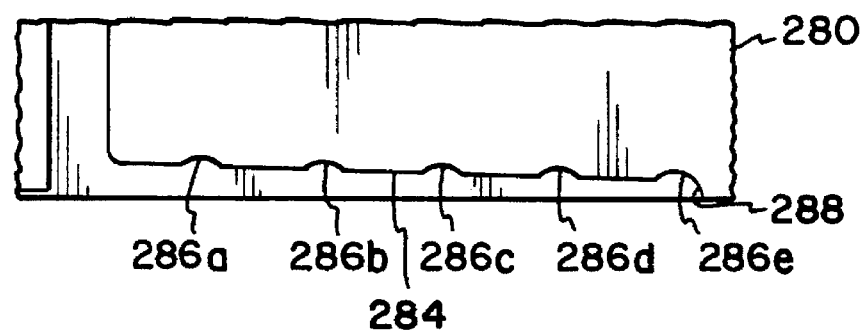
FIG. 9 is a side view of the ramp surface of the fitting shown in FIGS. 7 and 8, with the ramp surface shown in a planar representation.

Referring now to FIG. 12, a third embodiment of a windshield repair apparatus 310 including a support apparatus 312 is shown. Except for arm 314, a remainder of support apparatus 312 is constructed similarly in accordance with support apparatus 211 of FIGS. 5 and 6. Arm 314 is constructed in a similar manner as first arm 102 of support apparatus 14 shown in FIGS. 1 and 2. Arm 314 permits quick connect/disconnect of injector 320 which is constructed in a similar manner as injector 12, shown in FIGS. 2–4. Arm 314 is rotatable in a similar manner as arm 271 of apparatus 210. One difference in structure is that apparatus 310 does not include the self-leveling feature for curved windshields. Some adjustment for curves is possible through use of control screw 260 as shown in apparatus 210 of FIGS. 5 and 6, and the resilience of fitting 60.

Figure 13:
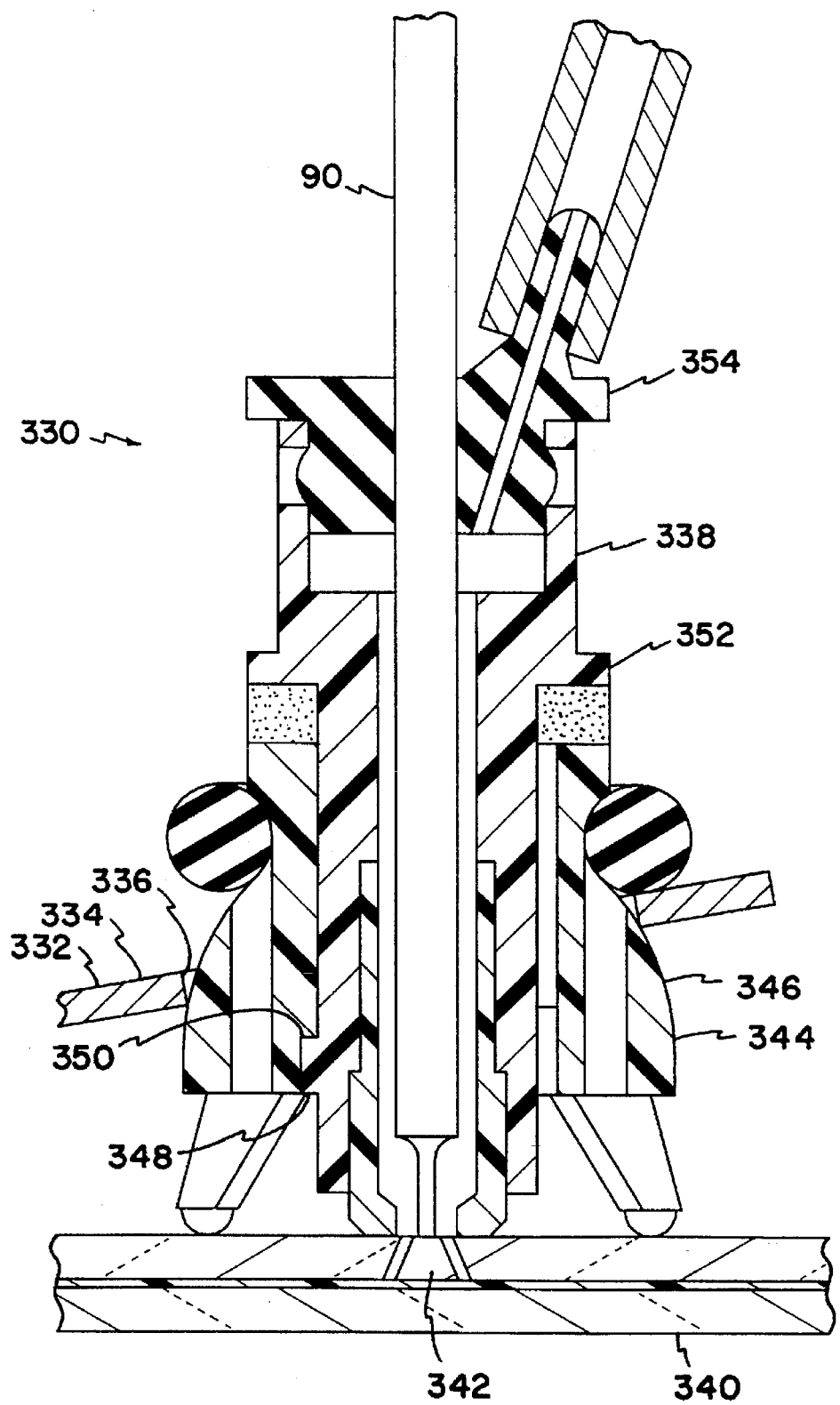
FIG. 13 is an enlarged cross-sectional side view of a portion of a fourth embodiment of a windshield repair apparatus.

Referring now to FIG. 13, a fourth embodiment of a windshield repair apparatus 330 is shown. A support apparatus 332 mounts an injector 338 to a windshield 340 for repair of a break area 342. Support apparatus 332 includes a support arm 334 with an aperture 336 for receipt of a fitting 344 with a spherical outside surface portion 346 for self-alignment of fitting 344 in support arm 334 over break area 342. Support apparatus 332 with support arm 344 can be constructed in accordance with support apparatus 211 shown in FIGS. 5, 6 and 11. Other support apparatus are possible which include an extending support arm like support arm 334 to hold fitting 344. Fitting 344 is similarly constructed as fitting 280 shown in FIGS. 5–8 and 11. Injector 338 includes a single bayonet 348 for mounting to ramp surface 350, such as described previously for fitting 280 and injector 217. Injector 338 includes a construction similar to injector 12 with respect to the features of a flange 352 and a stopper 354. Such a construction for windshield repair apparatus 330 allows for convenient connection/disconnection of injector 338 and support apparatus 332, adjustability of injector 338 with respect to support arm 334, and self-alignment of spherical fitting 344. Such construction also allows for receipt of probe 90 for mechanical engagement of break area 340 during pressurization and/or application of resin.

Figure 14:
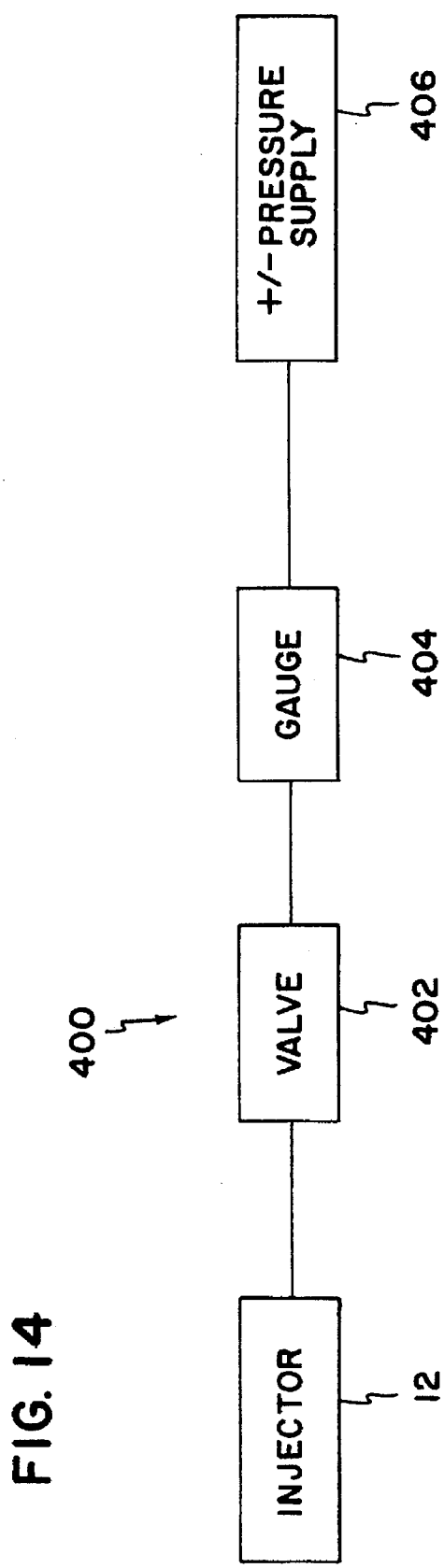
FIG. 14 is a schematic view of the air pressure system.

Referring now to FIG. 14, a schematic pressure system 400 is shown for use in pressurizing injector 12, or the other described injectors. Valve 402 controls air flow to and from injector 12. Gauge 404 provides an indication of the pressure in the system. Pressure source 406 is either or both a pressure source of pressures greater or less than atmospheric pressure. Pressures on the order of 60 p.s.i. vacuum and 30 p.s.i. positive pressure are useful to remove impurities and properly position the repair material. Gauge 404 allows the user to carefully monitor the pressures applied during use.

Controllably applying a vacuum to the break site facilitates removal of impurities from the site such as trapped air, moisture, dirt, and other debris. Controllably applying alternating positive and negative pressures facilitates proper repair material flow into the break site, while removing any trapped air bubbles which could detract from the look of the cured material.

Preferably, injectors 12, 217, 320, 338 include molded parts, particularly with respect to the construction of the bayonet feature. Similarly, arm 102 of support apparatus 14, fitting 280 of support apparatus 211, and fitting 344 of support apparatus 332 are made from molded materials. Suitable molded materials include plastics, which can be injection molded with the appropriate structures which are not easily made from metals by conventional machining processes. Cast metal parts are also possible, if desired.

The above-described structures allow for ease of use of the windshield repair apparatus to repair cracked windshields with crack filling resin. The various apparatus of the present invention allow for convenient site preparation, the removal of impurities that could detract from the look of the repaired site, and the convenient application of the repair material. Replaceability and use of the injector is facilitated by the bayonet mounting arrangement. The stopper construction allows for ease of use of the injectors to allow for both mechanical engagement of the break site and the application of pressure to remove impurities and to achieve proper placement of the repair material. Access to the break site for viewing is facilitated. Efficient use of the repair material is facilitated by only utilizing a sufficient amount in the small inner passage of the injector positioned over the break site.

It is to be understood, that even though numerous characteristics and advantages of the invention have been set forth in the foregoing description, together with details of the structure and function of the invention, the disclosure is illustrative only, and changes may be made in detail, especially in matters as such shape, size, and arrangement of the parts within the principles of the invention to the full extent indicated by the broad general meaning of the terms which the appended claims are expressed.

What is claimed is:

1. A windshield repair injector comprising:
    a body extending from a tip to an opposite end, the body having an outside surface, and an inner surface defining an inner passage;
    a resilient fitting disposed at the tip partially within the inner passage; and
    a resilient stopper with two passages closing off the opposite end in the inner passage.

2. The injector of claim 1, wherein one passage through the stopper is central to the stopper, and one passage is offset.

3. The injector of claim 2, wherein the offset passage includes a nipple.

4. The injector of claim 1, further comprising an elongated probe disposed in the central passage through the stopper.

5. The injector of claim 1, wherein the outside surface includes a bayonet.

6. The injector of claim 5, wherein the outside surface includes two opposed bayonets.

7. The injector of claim 1, wherein the outside surface includes a flange disposed between the bayonet and the opposite end of the body, and a resilient ring around the outside surface between the flange and the bayonet.

8. A windshield repair injector comprising:
    a body extending from a tip to an opposite end, the body having an inner surface extending from the tip to the opposite end defining an inner passage, and an outside surface including a bayonet, and a flange, the flange positioned between the bayonet and the opposite end; and
    a resilient fitting disposed at the tip partially within the inner passage.

* * * * *